United States Patent [19]

Flores

[11] Patent Number: 4,934,721

[45] Date of Patent: Jun. 19, 1990

[54] RUNNING BOARD ASSEMBLY

[75] Inventor: Patrick H. Flores, Oklahoma City, Okla.

[73] Assignee: Macklanburg-Duncan Co., Oklahoma City, Okla.

[21] Appl. No.: 282,673

[22] Filed: Dec. 12, 1988

[51] Int. Cl.$^5$ .............................................. B60R 3/00
[52] U.S. Cl. ...................................... 280/169; 182/90
[58] Field of Search .................. 280/163, 164.1, 164.2, 280/169; 182/90, 92

[56] References Cited

U.S. PATENT DOCUMENTS

| | | | |
|---|---|---|---|
| 4,203,611 | 5/1980 | Makela | 280/163 |
| 4,456,275 | 6/1984 | Snyder et al. | 280/163 |

*Primary Examiner*—Charles A. Marmor
*Assistant Examiner*—Richard Camby

*Attorney, Agent, or Firm*—Laney, Dougherty, Hessin & Beavers

[57] ABSTRACT

A multi-part running board structure mountable on vehicles, including inboard and outboard parts. The inboard part includes a facing plate adapted to abut the side of the vehicle and a step plate which extends substantially normal to the facing plate. The step plate part carries, at its outer edge, a tongue or groove adapted to be interconnected with a tongue or groove carried on a free inner edge of a second part of the running board. The outboard part carries a depending skirt at its outer edge, and a step plate which extends substantially normal to the skirt, and is adapted to be connected to, and positioned in coplanar alignment with, the step plate part of the inboard section. Such connection of the inboard part to the outboard part may be direct or may be through one or more intermediate step plate sections.

15 Claims, 3 Drawing Sheets

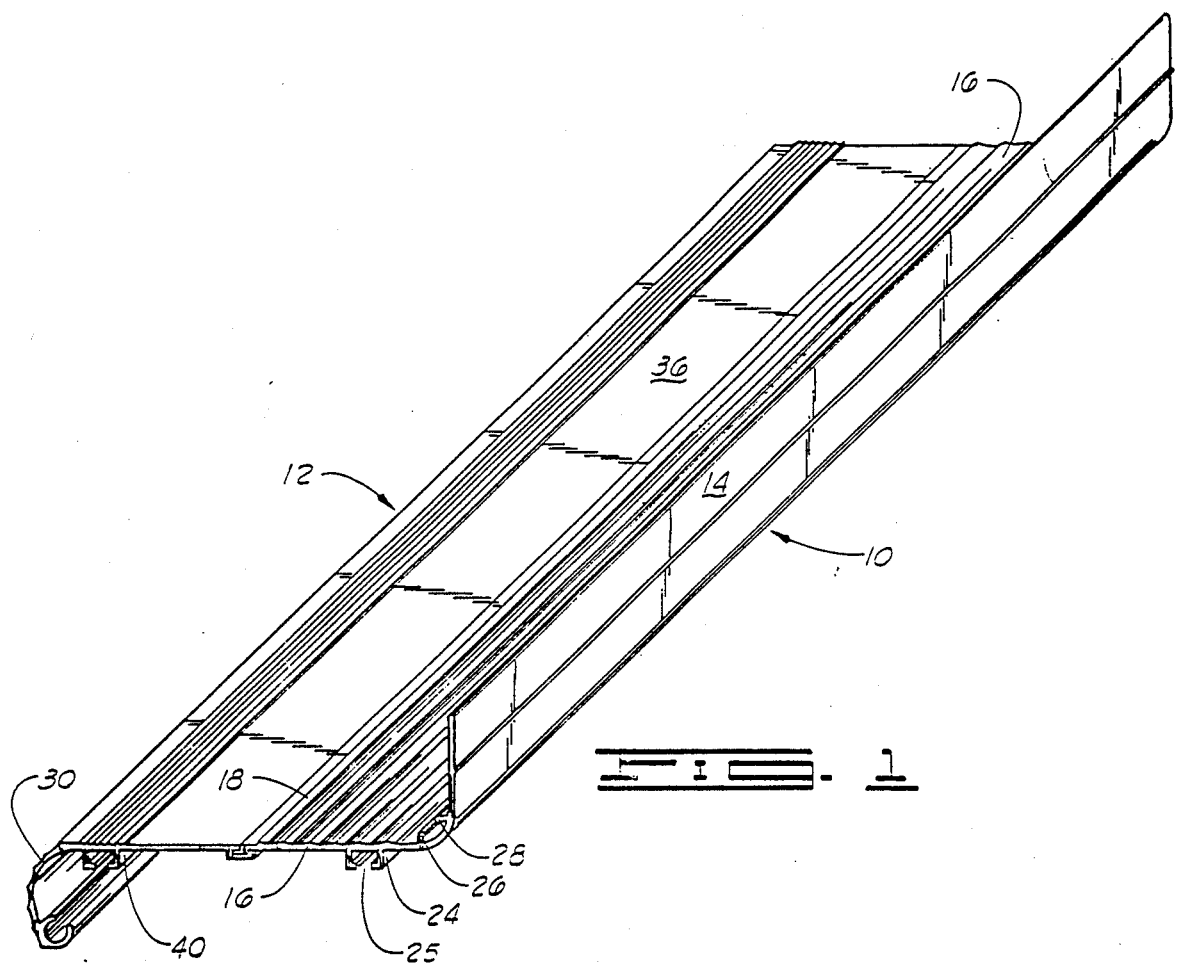
FIG. 1
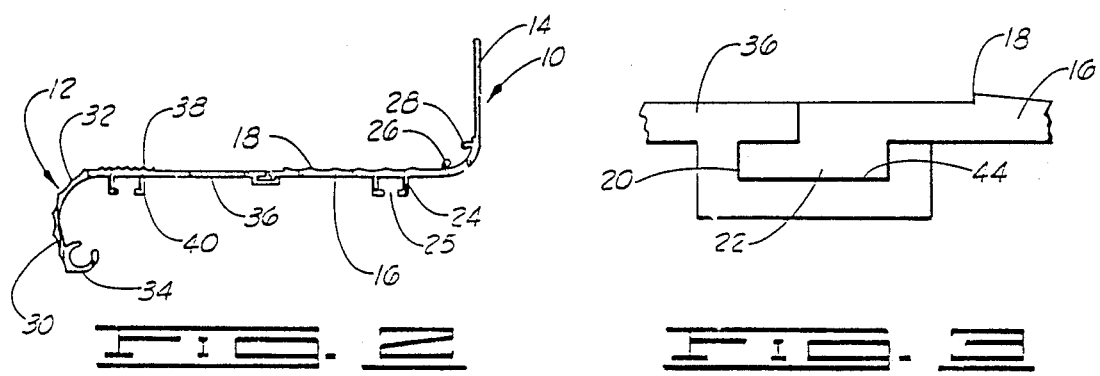
FIG. 2
FIG. 3

RUNNING BOARD ASSEMBLY

FIELD OF THE INVENTION

This invention relates to running boards, and more particularly, to a running board assembly which includes at least two parts which can be selectively assembled to alter the aesthetic appearance of the running board.

BACKGROUND OF THE INVENTION

Brief Description of the Prior Art

Heretofore, various types of running board structures have been used on trucks and other vehicles One type of structure used is a large metallic plate which is formed as a single piece. This type of running board structure is difficult to extrude in the sizes required, and does not permit various changes in its aesthetic appearance to be effected.

BRIEF DESCRIPTION OF THE PRESENT INVENTION

The present invention comprises a multi-part running board structure which includes at least two interfitting plates, such as extrusions. The use of a pair of interfitting extrusions permits different combinations of aesthetic design to be used. Thus, one of the parts of the running board may be one selected color and the other part, or several of the other parts, may be different colors. The geometry of the surface design of the extruded metal in each of the extruded parts can also be selectively different, and the interfitting parts of the running board permit various combinations to be changed out and utilized relatively easily.

Another aspect of the present invention is the provision of a multiple part running board in which at least two, and preferably three, extrusion sections are joined to each other so that one end of the running board is wider than the other end. This type of running board structure is particularly well adapted for use upon certain types of trucks which include dual rear wheels disposed behind the cab of the truck. In this type of truck, it is desirable to have the running board undergo a gradual widening from the forward end of the running board to the rear end thereof which is located adjacent the relatively large fender required to protect the dual wheels at the rear of the truck cab.

Broadly described, the running board of the invention includes at least two parts adapted to be interconnected to each other, in some instances directly, and in some instances, through a third part. The parts of the running board include an inboard part and an outboard part. The inboard part includes a facing plate adapted to be secured to the side of a vehicle immediately beneath the door to the cab thereof so that the running board can be used to step upwardly, and thereby gain easy access to the interior of the cab. The facing plate is secured to, and extends normal to, a step plate forming a second portion of the inboard part of the running board. The step plate is a monoplanar structure which carries at its outer edge, an engaging extrusion which may either be a tongue or a groove, but in any event, is adapted to be manually interconnected to a mating or cooperating outboard part carried on the outboard side of the running board.

The outboard part of the running board has an outer skirt portion which extends in a substantially vertical plane, and is joined at its upper edge to a step plate portion which extends normal to the skirt portion, and carries a tongue or groove adapted to interfit with the tongue or groove on the step plate of the inboard part.

An important object of the present invention is to provide an improved running board structure which can be quickly and easily mounted on a vehicle, and which includes a plurality of interfitting manually engagable parts which can be selectively tailored to provide different aesthetic effects.

Another object of the invention is to provide a multiple part running board in which several extruded sections of aluminum metal can be interengaged quickly and easily, and without the use of complicated tools and can be quickly mounted at a running board location on a truck or other vehicle.

A further object of the invention is to provide a multiple part running board structure which, by interfitting certain sections to each other, can be made of diminishing widths, and therefore be better accommodated to utilization on certain types of trucks.

Additional objects and advantages of the invention will become apparent as the following detailed description of the invention is read in conjunction with the accompanying drawings which illustrates certain preferred embodiments of the invention.

GENERAL DESCRIPTION OF THE DRAWINGS

FIG. 1 is a perspective view of the running board assembly of the invention.

FIG. 2 is an end view of the running board assembly as it appears when viewed from one end thereof.

FIG. 3 is an end view of the joint by which parts of the running board are interconnected.

DETAILED DESCRIPTION OF A PREFERRED EMBODIMENT OF THE INVENTION

Figure 4:
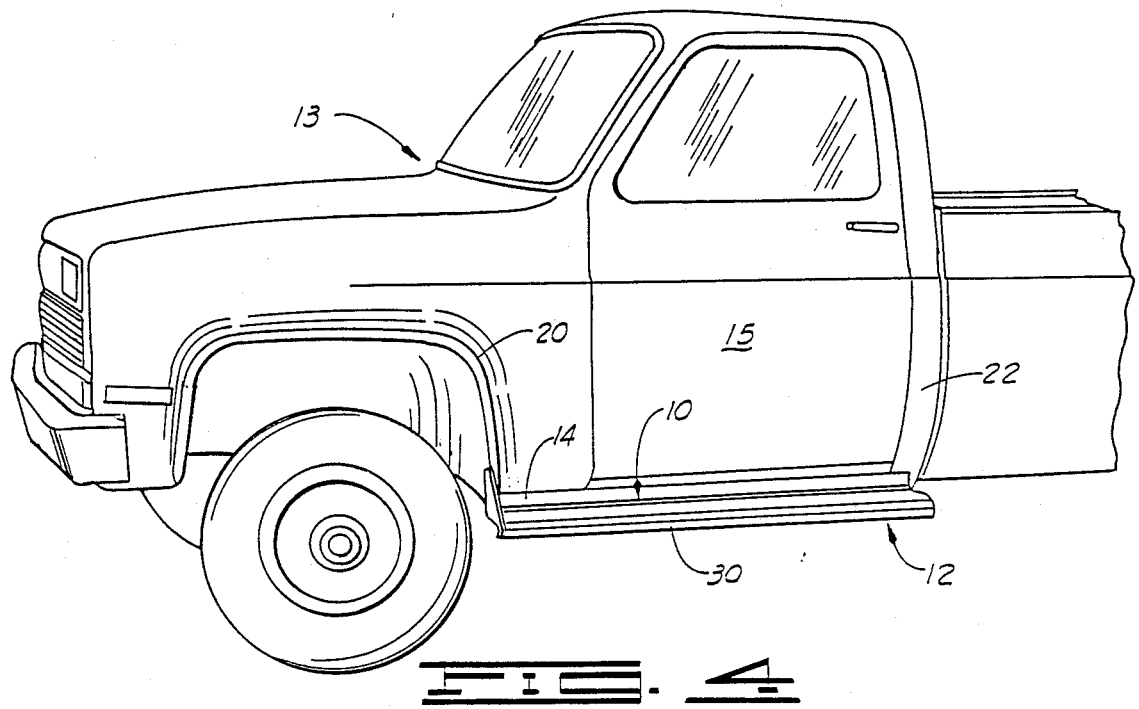
FIG. 4 illustrates the running board assembly as it appears when it is mounted on a vehicle in its operative position.

The running board assembly of the invention includes at least two parts which are detachably interconnected so that the parts can be changed out and various aesthetic combinations thereof used, if desired. In its most basic form, the running board assembly is of two-part construction and includes an inboard part and an outboard part. In a preferred embodiment of the invention, the inboard part and the outboard part are metal extrusions, and are of the general configuration illustrated in FIGS. 1–5. Here, the inboard part is designated generally by reference numeral 10 and the outboard part is designated generally by reference numeral 12. The two parts are detachably interconnected in a manner hereinafter described.

The inboard part 10 includes an elongated vertically extending facing plate 14 which is preferably of generally rectangular configuration. The facing plate 14 is adapted to bear flatly against, and extend along, a lower part of the side of a truck 13 or vehicle body immediately beneath the door 15. The facing plate 14 extends between the front fender 20 and the rear fender 22 as shown in FIG. 4. The facing plate 14 is formed integrally with, and extends normal to, an elongated step plate 16 of generally rectangular configuration.

The step plate 16 has formed on the upper side thereof, a plurality of traction ribs or ridges 18 which extend the length of the step plate and parallel to the facing plate 14. At its free outer edge 20, the step plate 16 carries a tongue 22 which extends the length of the step plate and extends parallel to the facing plate 14. As will be understood by those skilled in the art, the tongue 22 can be replaced by a groove in other embodiments of the invention, the only requirement of this structure being that of fulfilling the function of facilitating interconnection of the inboard part 10 with the outboard part 12.

In addition to the tongue 22, the step plate 16 also has provided as an extrusion thereupon, an elongated, generally C-shaped channel 24 which extends over the length of the inboard part 10 parallel to the facing plate 14. The channel 24 has a relatively narrow slot 25 as the mouth of, or entry to, the channel to facilitate the securement of the running board to supporting structural members carried on the vehicle 13 in a manner hereinafter described. The final elements optionally carried on the inboard part 10 are a pair of elongated, longitudinally extending reinforcing tongues or protuberances 26 and 28.

Figure 5:
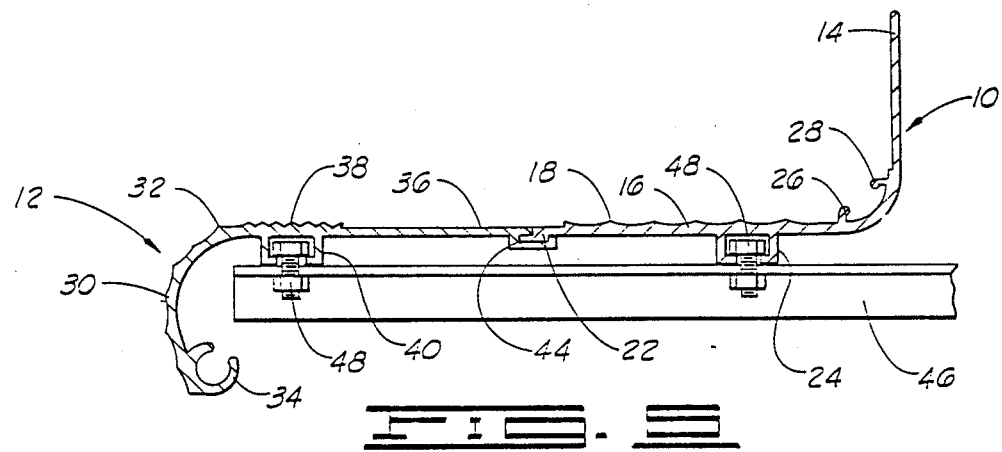
FIG. 5 is a sectional view taken transversely across the running board as it is mounted alongside a vehicle upon transverse supporting beams.

The outboard section 12 is connected to the inboard section 10 to complete the make-up of the running board. The outboard section 12 includes a downwardly extending skirt portion 30 which extends along the outer edge of the running board and depends downwardly therefrom as shown in FIGS. 1, 2 and 5. The skirt portion 30 of the outboard part 12 carries friction ribs 32 for both strength and for non-slip functions (see FIG. 5). The skirt 30 has a reinforcing, C-shaped bead 34 at its lower edge and this bead extends parallel to the facing plate 14, as does the downwardly extending skirt 30. The skirt 30 is connected at its upper edge to a step plate portion 36, and is preferably formed integrally with the step plate. The step plate portion 36 also carries friction ribs 38 on its upper side, and carries a C-shaped extruded channel 40 on its lower side. The C-shaped extruded channel 40 is substantially the same in cross-sectional configuration as the C-shaped extruded channel 24 carried on the step plate 16 of the inboard part 10. At its inner edge, the step plate portion 36 of the outboard part 12 carries a groove 44 which is configured to receive the tongue 22 of the step plate 16 of the inboard part 14.

For the purpose of mounting the running board of the invention to a vehicle, such as the truck 16, the facing plate 14 may be screwed or otherwise suitably fastened to the molding beneath the door 18, and to the lower part of the hood panel ahead of the door, if desired. Alternatively, or additionally, the running board can be secured to the vehicle by means of the engagement of the running board with a plurality of outwardly and laterally extending support beams, such as the support beam 46 illustrated in FIG. 5. The support beams 46 can be of various cross-sectional configurations, such as I-beams, H-beams, C-channels or the like, but in the illustrated embodiment of the invention are angled members of the type shown in FIG. 5. The angle members constituting the support beams 46 are secured to the chassis or frame of the vehicle and project outwardly substantially normal thereto to provide a cantilevered supporting structure for the running board. Securement of the running board is effected by suitable threaded fasteners and nuts of the type depicted in FIG. 5, and there designated by reference numeral 48. It will be noted that these fastening elements include a threaded shank which passes through an aperture formed in a flange of the angle members constituting the support beams 46, and that the heads of these threaded fasteners are placed within the large space within the C-shaped channels 24 and 40 which are extruded on the lower surfaces of the step plate portions 16 and 36, respectively, of the inboard part 10 and outboard part 12.

In the normal and usual method of assembling the running board, the inboard part 10 and outboard part 12 will initially be interconnected by means of the tongue and groove connection depicted in FIG. 3. It will be understood, of course, that the running board can be made so that the tongue can be carried on either the inboard part 10 or the outboard part 12 and the groove on the other of the two integrated parts. Also, other means of interconnection can be employed.

The inboard and outboard parts 10 and 12 are preferably elongated aluminum extrusions. The two parts can be made in various colors and the surface design carried on the upper side of the two step plate portions of the inboard part 10 and the outboard part 12 can be varied. It is also possible to select varying widths of either the inboard part or the outboard part to suit the particular needs in the case of various types of vehicles, or preferences of the owner.

In whatever way the two parts 10 and 12 are quickly interconnected and assembled to form the complete running board, the running board is then mounted on the vehicle 13 at the location depicted in FIG. 4, and is secured to the vehicle by any suitable means, but preferably, by the use of a cantilevered support system of the type depicted in FIG. 5, where a number of these supporting beams 46 spaced from each other in a fore-and-aft direction along the vehicle are provided to support the running board which is fastened to the beams.

Figure 6:
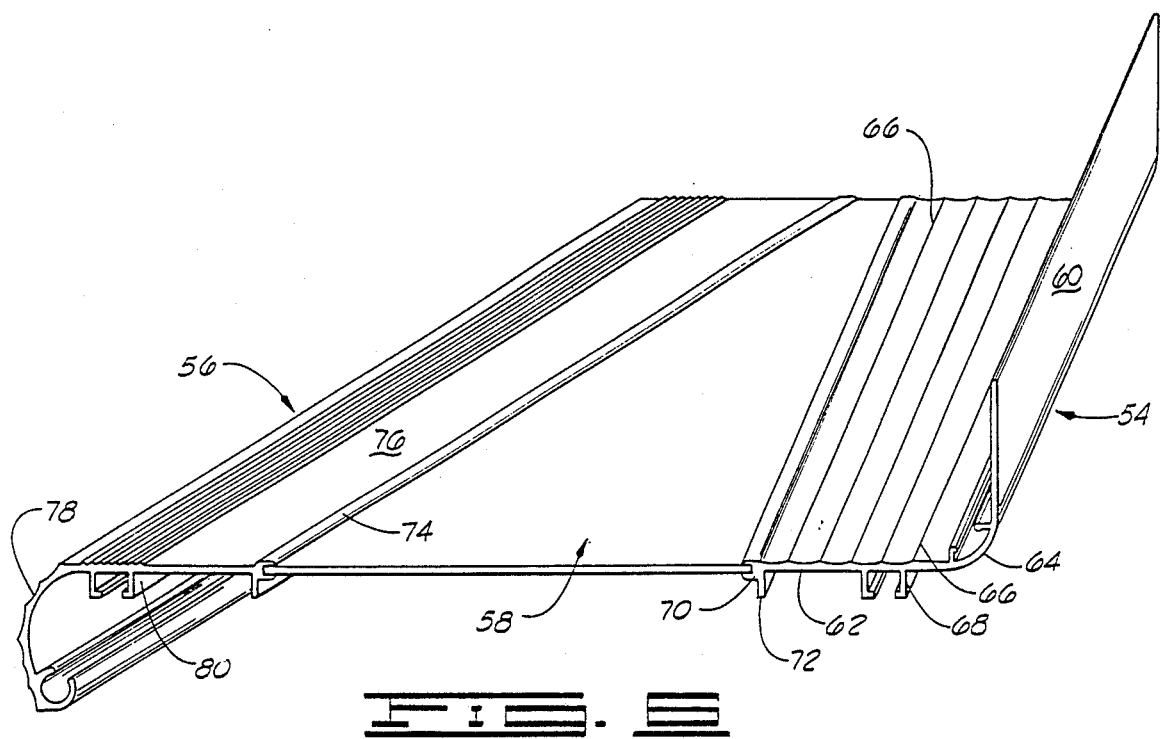
FIG. 6 is a perspective view of a different embodiment of the invention.
Figure 7:
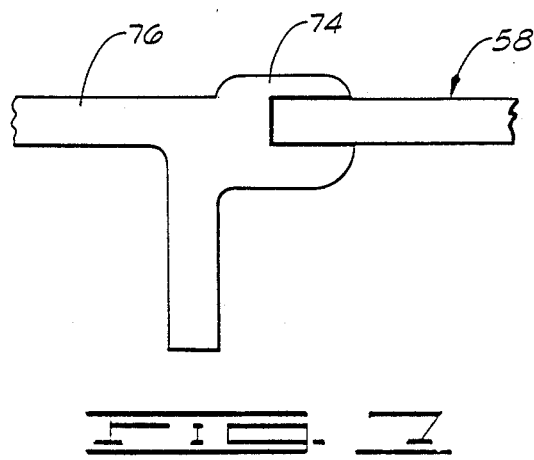
FIG. 7 is an elevation view showing a type of joint utilized in the running board embodiment shown in FIG. 6.

A different embodiment of the invention is illustrated in FIGS. 6 and 7. In this embodiment of the invention, a three-part running board is illustrated, and the three parts of the running board are, as previously indicated, preferably metal extrusions. The running board again includes an inboard part 54 and an outboard part 56. These parts are interconnected by a central, trapezoidally-shaped step plate expander 58, which constitutes the third part of the three-part running board illustrated in FIG. 6.

The inboard part 54 again includes a face plate 60 which is joined at its lower edge to a horizontally extending step plate 62. The face plate 60 is joined to the step plate 62 through an arcuate corner portion 64 with all these parts preferably being formed as a single extrusion. A plurality of friction ribs 66 are carried on the upper side of the step plate 62 in the manner hereinbefore described, and the step plate also has an elongated generally C-shaped extrusion channel 68 formed on the lower side thereof. At its inner edge, the step plate 62 carries a groove 70 and a downwardly extending reinforcing flange or rib 72. The groove 70 functions to engage one lateral edge of the trapezoidal-spacer plate 58.

At its opposite side, the spacer plate 58 extends into a groove 74 which is carried at the inner edge of a step plate 76 forming a portion of the outboard part 56 of the running board. The outboard part 56 further includes a skirt portion 78 which extends downwardly from the outer edge of the step plate 76. The step plate 76 has an elongated generally C-shaped channel 80 formed on the lower side thereof and provided for the purpose of permitting the running board to be interconnected to a plurality of supporting beams in the manner hereinbefore described, and illustrated in FIG. 5 of the drawings.

When the three-part running board of the type constituting the second embodiment of the invention herein described, and being that illustrated in FIGS. 6 and 7, is utilized, the running board of the invention can be made substantially smaller at its forward end, where the narrow portion of the trapezoidal-spacer plate 58 is to be found and relatively wider at the rear end. This accommodates the running board to those types of trucks where there is a dual or tandem wheel disposed at the rear of the cab, and on each side of the vehicle, with only single wheels located at the forward end of the vehicle just ahead of the cab. In this case, a larger fender will be provided to the rear of the cab, and in order to provide an aesthetic appearance and the most useful form of running board, the three-part construction depicted in FIGS. 6 and 7 should be employed. Where the three-part running board of the sort here under discussion is used, a relatively larger number of choices of designs and configurations is available to the user.

Although certain preferred embodiments of the invention have been herein illustrated and described, and certain operating principles underlying the invention have been explained, it will be understood that various changes and innovations can be effected in the described embodiments of the running board of the invention, and no departure from the spirit and scope of the invention will be entailed in making such changes and innovations. Therefore, all such modifications and changes of a nature such that the principles of the invention are still incorporated in the resulting structure are deemed to be circumscribed by the spirit and scope of the invention, except as the same may be necessarily limited by the appended claims, or reasonable equivalents thereof.

What is claimed is:

1. A vehicle running board adapted for attachment to the side of a vehicle beneath the door, said running board comprising:
    an inboard part and an outboard part detachably connected to each other so that each of the two parts can be easily replaced by another part, said inboard part comprising:
    a face plate;
    a first step plate joined to said face plate at one edge thereof and extending substantially normal to said face plate and having an outboard edge extending substantially parallel to said face plate; and
    a tongue and groove-type joint part secured along said outboard edge of the step plate, and extending over substantially the entire length of the step plate parallel to said face plate; and
    wherein said outboard part comprises:
    a second step plate having an inboard edge and having an outboard edge and positioned in substantially coplanar alignment with the first step plate carried on said inboard part; and
    a skirt portion extending from said outboard edge of said second step plate and in a direction generally normal to said second step plate; and
    means for quick detachably interconnecting the inboard edge of the second step plate with said tongue and groove-type joint part.

2. A vehicle running board as defined in claim 1 wherein said inboard part and said outboard part are each a single metallic extrusion.

3. A vehicle running board as defined in claim 1 wherein said quick detachably interconnecting means comprises an expander plate having a first edge connected to the inboard edge of said second step plate, and a second edge connected to said tongue and groove-type joint part.

4. A vehicle running board as defined in claim 3 wherein said expander plate is of trapezoidal configuration.

5. A vehicle running board as defined in claim 1 wherein said first step plate extends substantially horizontally and has an upper surface and a lower surface and wherein said running board is further characterized as including fastener means secured to the lower surface of said first step plate for fastening the running board to an automobile.

6. A vehicle running board as defined in claim 2 and further characterized as including:
    a first elongated, extruded mounting channel on said first step plate and extending substantially parallel to said face plate; and
    a second elongated, extruded mounting channel on said second step plate.

7. A vehicle running board as defined in claim 2 and further characterized as including traction ribs extruded on each of said first and second step plates.

8. A vehicle running board as defined in claim 2 and further characterized as including a reinforcing bead located on, and extending the length of, said skirt portion.

9. A vehicle running board as defined in claim 1 wherein said means for quick detachably interconnecting the inboard edge of the second step plate comprises a second tongue and groove-type joint part engaging said first mentioned tongue and groove-type joint part.

10. A vehicle running board as defined in claim 9 wherein said inboard part is an elongated aluminum extrusion, and wherein said outboard part is an elongated aluminum extrusion.

11. A vehicle running board as defined in claim 10 wherein said first step plate extends substantially horizontally and has an upper surface and a lower surface and wherein said running board is further characterized as including fastener means secured to the lower surface of said first step plate for fastening the running board to an automobile.

12. A vehicle running board as defined in claim 11 and further characterized as including:
    a first elongated, extruded mounting channel on said second step plate.

13. A vehicle running board as defined in claim 11 and further characterized as including traction ribs extruded on the upper surface of said first step plate.

14. A vehicle running board comprising:
    an elongated rigid metallic inboard part which includes:
    an elongated, vertically extending face plate; and
    an elongated, horizontally extending step plate having an upper surface, a lower surface and secured to, and extending normal to, said face plate, said step plate further including an outboard edge; and means for connecting said outboard edge to a horizontally extending rigid expander plate;

an elongated, horizontally extending rigid expander plate of trapezoidal configuration having an inboard edge engaged by said connecting means, and further having an outboard edge converging toward the inboard edge of said expander plate; and an elongated, rigid metallic outboard part which includes:

an elongated, horizontally extending second step plate having an upper surface, a lower surface and an inboard connecting edge detachably connected to the outboard edge of said expander plate; and an elongated skirt portion connected to said second step plate and extending downwardly therefrom.

15. In combination:

a vehicle having a cab, doors on opposite sides of the cab, a forward fender ahead of each of the doors, and a rear fender positioned to the rear of each of said doors, and horizontally extending support beams extending laterally out from opposite sides of the vehicle at a level immediately below the doors; and a running board supported upon, and detachably secured to, said support beams with one of said running boards located on each of the opposite sides of said cab below one of the doors and extending between one of said forward fenders and one of said rear fenders, each of said running boards comprising:

an elongated extruded inboard part having:

an elongated, vertically extending face plate bearing against said vehicle at a location below one of the doors; and an elongated, horizontally extending first step plate formed integrally with said face plate and extending normal thereto; and an elongated extruded outboard part having:

an elongated, horizontally extending second step plate positioned alongside said first step plate and in coplanar alignment with said first step plate, and having an outboard edge and an inboard edge detachably engaged with said first step plate; and an elongated skirt portion extending downwardly from said outboard edge of said second step plate.

* * * * *